Dec. 25, 1951      G. C. BARNES      2,580,067
COLLET WITH INTERCHANGEABLE PADS
Filed June 30, 1948
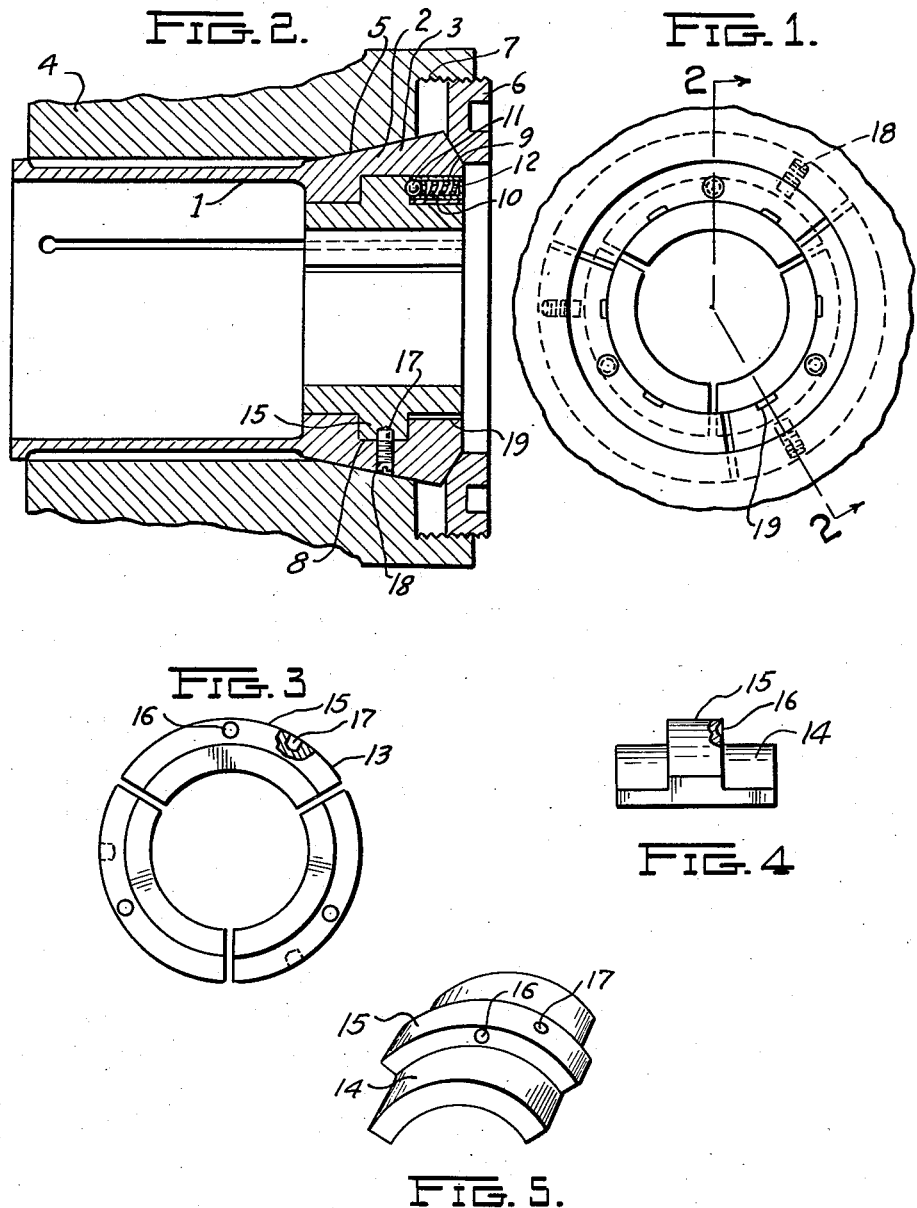
INVENTOR.
Gerald C. Barnes
BY
Barnes, Kissele, Laughlin & Raisch
ATTORNEYS Patented Dec. 25, 1951

2,580,067

UNITED STATES PATENT OFFICE 2,580,067

COLLET WITH INTERCHANGEABLE PADS

Gerald C. Barnes, Plymouth, Mich.

Application June 30, 1948, Serial No. 36,142

3 Claims. (Cl. 279—51)

This invention relates to collets or chucks for holding work or a tool.

It is the object of the present invention to provide a chuck or collet which is adapted to take objects of different diameters by utilizing interchangeable collet pads which can be easily and quickly taken out of the collet head and replaced.

Referring to the drawings:

Figure 1 is a front elevational of my improved collet.

Figure 2 is a section on the line 2—2 of Figure 1.

Figure 3 is an elevation of a set of collet pads.

Figure 4 is an end elevation of one of the removable collet pads.

Figure 5 is a perspective of one of the collet pads.

The split spring sleeve is designated 1. This terminates in a head 2 formed of sections that are integral to the split portions of the sleeve. The collet head is tapered on the outside as at 3, to provide conical head sections. A sliding collar 4 is provided with a conical socket 5 adapted to engage the conical surfaces of the head sections to contract these when shifted to the right or allow these to expand when shifted to the left. The threaded ring 6 engages the threads 7 on the inside of the hollow or recessed end of the collar. This threaded ring 6 completes the assembly of the sliding collar over the split spring sleeve. This much of the construction is not new. This is only one way that the collet sleeve sections may be contracted on the work or allowed to expand after being contracted. This arrangement is illustrated and described just by way of example and I do not wish to be limited to this arrangement for contracting and allowing the expansion of the split collet sleeve as other ways can be used. I have not illustrated the arrangement by which the slidable collar can be actuated to slide it to the left or right as this is no part of the invention and several ways of doing this are in use and are well known.

On the inside of the split collet head there is an annular groove 8 which preferably is of rectangular cross section. I drill an opening 9 from the outside face of the collet head through each section into the annular groove. Into this I fit an open-ended capsule 10 in which engages a ball detent 11 pressed outwardly into the turned over end of the capsule by coil spring 12.

I provide a set of collet pads 13, here shown as three in number, but the number may vary. Each collet pad has a cylindrical segment 14 with an annular rib segment 15 on the back of the cylindrical section. These ribs of the several pad segments are adapted to fit into the annular recess as shown in Figure 2 of the drawings. When a segment has been put in place it will be retained in position by means of the ball detent 11 snapping into the partly spherical notch 16 in the side wall of the rib. The several sections may be snapped in place this way with the notches 17 fitted over the ends of pins or keys 18 which may be screwed or driven into the head as shown particularly in Figure 2. These pins or keys are not necessary but are merely an added precaution to prevent the pads from slipping when the work or tool is gripped. Ordinarily, when the collet pads are closed down on the work or tool, there would be plenty of friction to prevent slippage of the work or tool, consequently a key is not necessary.

When it is desired to use the collet for a tool or work of somewhat larger or smaller diameter, the set of pads may be quickly removed and another set easily replaced. The removal is effected by putting the bit of a screw driver in one of the notches 19 in the inside of the collet head and prying the pad section loose. When all three sections have been taken out, a new set of pads of a different diameter opening may be readily set in place by simply snapping them back in place with the notch 17 over the end of the pin and the partly spherical notch 16 engaging the ball detent.

What I claim is:

1. A collet, having in combination a split spring sleeve and collar arranged for relative motion, the said collar having a conical flared out mouth, said split spring sleeve having an enlargement at its outer end forming a head with outwardly diverging segments fitting into the conical mouth of the collar, the said head segments contracting when relative movement takes place between the collar and the sleeve longitudinally toward each other and the segments expanding when relative movement takes place away from each other, the said segments having each a segmental groove rectangular in cross section, the segmental grooves forming in their totality a split annular groove, each segment having a recess extending longitudinally of the sleeve, a spring and detent secured in each recess with the detent extending into the annular groove of the said split spring sleeve head, and a plurality of segmental pads each comprising a segment of a cylinder with a rib on its exterior of rectangular cross section and dimensioned to fit accurately in the segmental groove of the head segment, each rib having on its outside face a notch to receive the spring-press detent when the rib is fitted into its groove and the segment shifted so that the detent and notch register.

2. The combination claimed in claim 1 in which the detent and spring are contained in a capsule retained in the recess in the head segment.

3. The combination claimed in claim 1 in which each pad has a notch in the periphery of its rib and the annular groove segments have each a key pin to fit in the notch when a pad is snapped in place to prevent turning and to guide the detent into the notch in the outside of the rib.

GERALD C. BARNES.

REFERENCES CITED

The following references are of record in the file of this patent:

UNITED STATES PATENTS

| Number | Name | Date |
|---|---|---|
| 1,499,728 | Hanson | July 1, 1924 |
| 1,623,885 | Montgomery | Apr. 5, 1927 |
| 2,089,121 | Hartung | Aug. 3, 1937 |
| 2,228,337 | Balar | Jan. 14, 1941 |
| 2,374,192 | Godfrey | Apr. 24, 1945 |